(12) United States Patent
Baek et al.

(10) Patent No.: US 10,284,503 B2
(45) Date of Patent: May 7, 2019

(54) MOBILE TERMINAL AND CONTROL METHOD THEREOF

(71) Applicant: LG ELECTRONICS INC., Seoul (KR)

(72) Inventors: Bumhyeon Baek, Seoul (KR); Kyungdong Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/762,053

(22) PCT Filed: Sep. 25, 2015

(86) PCT No.: PCT/KR2015/010224
§ 371 (c)(1),
(2) Date: Mar. 21, 2018

(87) PCT Pub. No.: WO2017/051962
PCT Pub. Date: Mar. 30, 2017

(65) Prior Publication Data
US 2018/0287977 A1    Oct. 4, 2018

(51) Int. Cl.
*H04W 4/06* (2009.01)
*H04L 12/58* (2006.01)
*H04M 1/725* (2006.01)

(52) U.S. Cl.
CPC ............. *H04L 51/10* (2013.01); *H04L 51/08* (2013.01); *H04M 1/725* (2013.01); *H04W 4/06* (2013.01)

(58) Field of Classification Search
CPC ........... H04W 4/00; H04W 4/10; H04W 4/18; H04W 76/45
See application file for complete search history.

(56) References Cited

U.S. PATENT DOCUMENTS 6,084,951 A * 7/2000 Smith ............. H04M 1/274516
                                                        379/93.17
8,874,090 B2 * 10/2014 Abuan ................... H04N 7/147
                                                        455/416
(Continued)

FOREIGN PATENT DOCUMENTS

JP      2009205370      9/2009
KR   1020060054618      5/2006
(Continued)

OTHER PUBLICATIONS

PCT International Application No. PCT/KR2015/010224, International Search Report dated Jun. 27, 2016, 2 pages.

*Primary Examiner* — Jean A Gelin
(74) *Attorney, Agent, or Firm* — Lee, Hong, Degerman, Kang & Waimey

(57) ABSTRACT

The present invention relates to a mobile terminal enabling data transmission and reception and a control method thereof. A mobile terminal according to the present invention includes: a display unit for outputting an image including a specific object and outputting a data input window on the basis of a predetermined user input to the specific object; a wireless communication unit for transmitting the input data to an external terminal corresponding to the specific object on the basis of data inputted to the data input window; and a controller for outputting the input data on the image and for outputting the received data on the image on the basis of data received from the external terminal.

20 Claims, 13 Drawing Sheets

(56) References Cited

U.S. PATENT DOCUMENTS

| | | | |
|---|---|---|---|
| 9,285,951 B2* | 3/2016 | Makofsky | A63F 13/79 |
| 2006/0050141 A1* | 3/2006 | Yoshimura | H04N 7/142 |
| | | | 348/14.02 |
| 2007/0260984 A1* | 11/2007 | Marks | A63F 13/06 |
| | | | 715/706 |
| 2010/0156781 A1* | 6/2010 | Fahn | H04M 1/72544 |
| | | | 345/156 |
| 2010/0178947 A1* | 7/2010 | Kim | H04M 1/72552 |
| | | | 455/466 |
| 2014/0130143 A1* | 5/2014 | Choi | H04L 63/0853 |
| | | | 726/7 |
| 2014/0143725 A1* | 5/2014 | Lee | G06F 17/30017 |
| | | | 715/834 |
| 2015/0113432 A1* | 4/2015 | Jung | H04L 67/10 |
| | | | 715/748 |
| 2015/0199385 A1* | 7/2015 | Choi | G06F 17/30265 |
| | | | 382/305 |

FOREIGN PATENT DOCUMENTS

| KR | 1020130082693 | 7/2013 |
|---|---|---|
| KR | 1020140017959 | 2/2014 |
| KR | 1020150074832 | 7/2015 |

* cited by examiner

MOBILE TERMINAL AND CONTROL METHOD THEREOF

CROSS-REFERENCE TO RELATED APPLICATIONS

This application is the National Stage filing under 35 U.S.C. 371 of International Application No. PCT/KR2015/010224, filed on Sep. 25, 2015, the contents of which are all hereby incorporated by reference herein in its entirety.

TECHNICAL FIELD

The present disclosure relates to a mobile terminal capable of transmitting and receiving data and a control method thereof.

BACKGROUND ART

Terminals may be divided into a mobile terminal (mobile/portable terminal) and a stationary terminal according to whether the terminal may be moved. The mobile terminal may be divided into a handheld terminal and a vehicle mounted terminal according to whether the user may carry the mobile phone directly.

The functions of mobile terminals are diversified. For example, there are functions of data and voice communication, photographing and video shooting through a camera, voice recording, music file playback through a speaker system, and outputting an image or video to a display unit. Some terminals are equipped with an electronic game play function or a multimedia player function. In particular, modern mobile terminals may receive multicast signals that provide visual content such as broadcast, video or television programs.

As functions are diversified, terminals are implemented in the form of multimedia devices supporting composite functions such as photographing or video shooting, music or video file playback, playing games, receiving broadcast, and the like.

In order to support and enhance the functionality of such terminals, it may be considered to improve the structural and/or software parts of the terminal.

Meanwhile, in order to transmit a message, while viewing a picture image stored in a photo album, a messenger application needs to be executed and a photo image (i.e., a picture image or a photograph image) is to be transmitted to a conversation counterpart, causing user inconvenience.

DISCLOSURE

Technical Problem

An aspect of the present disclosure is directed to solving the above-mentioned problems and other problems. Another aspect of the present disclosure provides a mobile terminal capable of transmitting a message, while sharing an image being output with a conversation counterpart related to the image, and a control method thereof.

Technical Solution

According to an aspect of the present invention, there is provided a mobile terminal including: a display unit outputting an image including a specific object and outputting a data input window when a preset user input is applied to the specific object; a wireless communication unit, when data is input to the data input window, transmitting the input data to an external terminal corresponding to the specific object; and a controller outputting the input data on the image and outputting, when data is received from the external terminal, the received data on the image.

In an embodiment, when a preset event occurs, the controller may switch the image to another image detected on the basis of data related to the image.

In another embodiment, the controller may switch image including a specific person to another image including the specific person at every preset period.

In another embodiment, the controller may switch the image to another image detected on the basis of a location and a time at which the image was captured, at every preset period.

In another embodiment, on the basis of transmission and reception of specific data to and from the external terminal, the controller may switch the image to another image detected on the basis of the specific data.

In another embodiment, on the basis of a user input applied to select at least one of a plurality of images detected on the basis of data related to the image, the controller may switch the image to the at least one selected image.

In another embodiment, when a preset user input is applied to schedule information stored in a schedule application, the controller may output data transmitted to and received from an external terminal corresponding to the schedule information, on an execution screen of the schedule application.

In another embodiment, when a preset user input is applied to an image including a plurality of specific objects, the controller may output data transmitted to and received from a plurality of external terminals respectively corresponding to the plurality of specific objects, on the image.

In another embodiment, when a user input is applied to select at least one of the plurality of specific objects, the controller may output data transmitted to and received from at least one external terminal corresponding to each of the at least one selected object, on the image.

In another embodiment, the controller may detect an external terminal corresponding to the specific object on the basis of data related to the image or data input by a user.

Also, according to another aspect of the present invention, there is provided a method of controlling a mobile terminal including: (a) outputting an image including a specific object and outputting a data input window when a preset user input is applied to the specific object; (b) when data is input to the data input window, transmitting the input data to an external terminal corresponding to the specific object; and (c) outputting the input data on the image, and outputting, when data is received from the external terminal, the received data on the image.

In an embodiment, (c) may include: switching the image to another image detected on the basis of data related to the image, when a preset event occurs.

In another embodiment, (c) may include: switching the image including a specific person to another image including the specific person at every preset period.

In another embodiment, (c) may include: switching the image to another image detected on the basis of a location and a time at which the image was captured, at every preset period.

In another embodiment, (c) may include: switching, on the basis of transmission and reception of specific data to and from the external terminal, the image to another image detected on the basis of the specific data.

In another embodiment, (c) may include: switching, on the basis of a user input applied to select at least one of a plurality of images detected on the basis of data related to the image, the image to the at least one selected image.

In another embodiment, (c) may include: outputting, when a preset user input is applied to schedule information stored in a schedule application, data transmitted to and received from an external terminal corresponding to the schedule information, on an execution screen of the schedule application.

In another embodiment, (c) may include: outputting, when a preset user input is applied to an image including a plurality of specific objects, data transmitted to and received from a plurality of external terminals respectively corresponding to the plurality of specific objects, on the image.

In another embodiment, (c) may include: outputting, when a user input is applied to select at least one of the plurality of specific objects, data transmitted to and received from at least one external terminal corresponding to each of the at least one selected object, on the image.

In another embodiment, (a) may include: detecting an external terminal corresponding to the specific object on the basis of data related to the image or data input by a user.

Advantageous Effects

Effects of the mobile terminal and the control method according to the present invention will be described as follows.

According to at least one of the embodiments of the present invention, a user may immediately exchange messages with a conversation counterpart, while sharing an image, even without executing a messenger application.

Also, according to at least one of the embodiments of the present invention, an image shared with the conversation counterpart may be appropriately switched according to situations.

As a result, user convenience may be improved.

Further scope of applicability of the present invention will become apparent from the following detailed description. It should be understood, however, that the detailed description and specific examples, such as the preferred embodiments of the invention, are given by way of illustration only, since various changes and modifications within the spirit and scope of the invention will be apparent to those skilled in the art.

BEST MODES

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as a digital TV, a desktop computer and a digital signage.

Figure 1A:
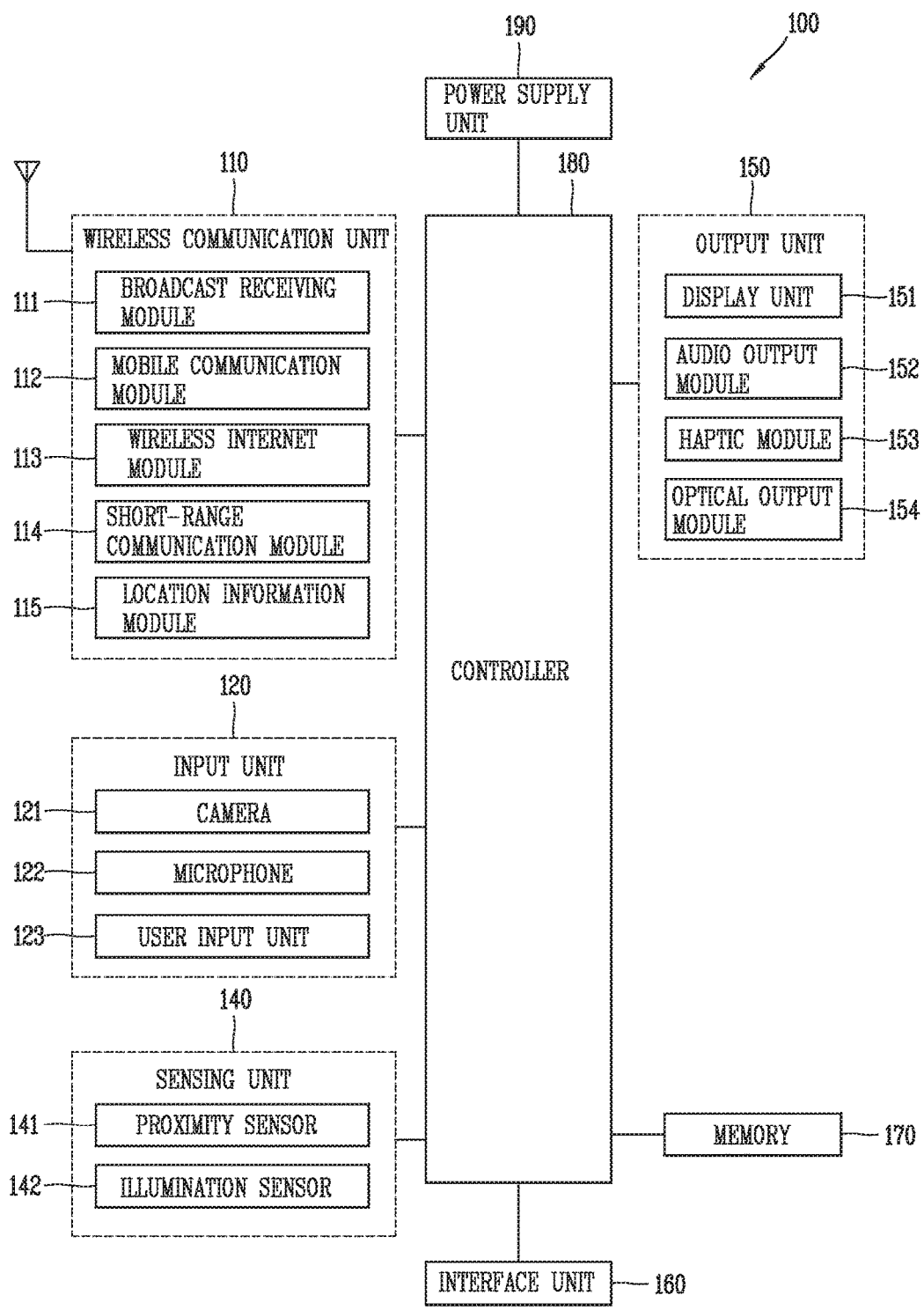
FIG. 1A is a block view illustrating a mobile terminal according to the present invention.
Figure 1B:
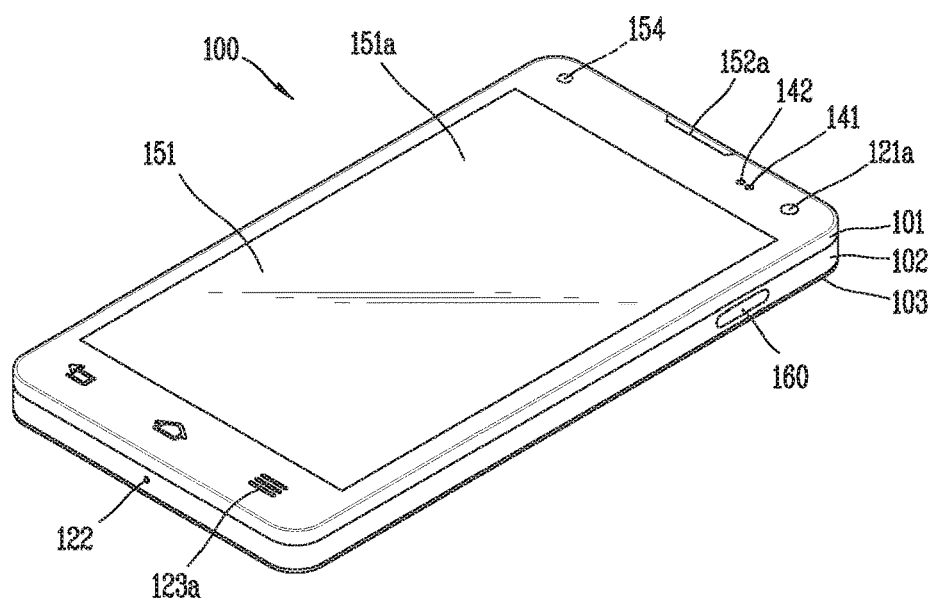
FIGS. 1B and 1C are conceptual views illustrating an example of a mobile terminal according to the present invention viewed in different directions.
Figure 1C:
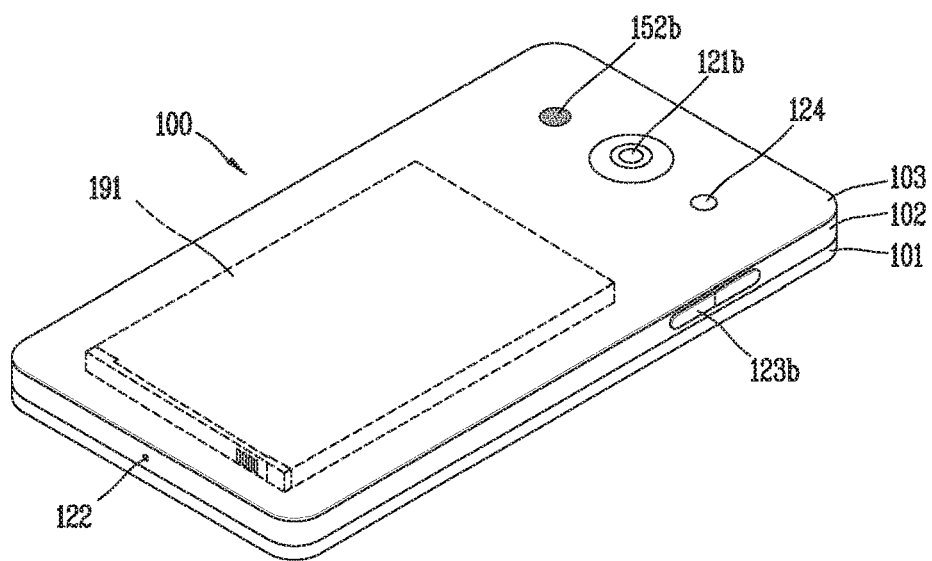

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit

160, a memory 170, a controller 180, and a power supply unit 190. It is understood that implementing all of the illustrated components is not a requirement, and that greater or fewer components may alternatively be implemented.

The mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

The controller 180 controls some or all of the components illustrated in FIG. 1A in order to drive an application program stored in the memory 170. Further, the controller 180 may operate at least two of the components of the mobile terminal 100 in order to drive the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a mobile terminal 100 according to various embodiments to be explained later. The operation or the control method for the mobile terminal may be implemented on the mobile terminal by driving at least one application program stored in the memory 170.

Before explaining various embodiments of the mobile terminal 100, the aforementioned components will be explained in more detail with reference to FIG. 1.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor provided at the display unit 151 may be configured to sense touch input in an activated state and a deactivated state, using different methods. The different methods may be associated with an activation period of the touch sensor. More specifically, the touch sensor may be activated with a different period according to an activated state or a deactivated state of the display unit 151. That is, the touch sensor may sense a touch input applied thereon, with a different activation period, according to an activated state or a deactivated state of the display unit 151.

For instance, in a deactivated state of the display unit 151, the touch sensor may be activated with a preset period. In this case, the preset period may be a time period more than 0. On the other hand, in an activated state of the display unit 151, the touch sensor may be always operated in an activated state. In this case, an activation period of the touch sensor may be a time period of 0 or very close to 0.

Whether the touch sensor is in an activated state or a deactivated state may be determined based on a power consumption amount of the touch sensor. For instance, if a power consumption amount of the touch sensor is equal to or less than a preset value based on '0', it may be determined that the touch sensor is in a deactivated state. On the other hand, if a power consumption amount of the touch sensor exceeds the preset value based on '0', it may be determined that the touch sensor is in an activated state.

If the display unit 151 is in an activated state (hereinafter, will be referred to as an active mode), the touch sensor may wait for a touch input to the display unit 151, while maintaining an activated state. On the other hand, if the display unit 151 is in a deactivated state (hereinafter, will be referred to as a doze mode), the touch sensor may be activated at preset periods.

When the preset activation period of the touch sensor is shorter, a sensing speed with respect to a touch input applied onto the display unit 151 is higher. However, in this case, a power consumption amount of the touch sensor may be increased. On the other hand, when the preset activation period of the touch sensor is longer, a sensing speed with respect to a touch input applied onto the display unit 151 may be lower, while a power consumption amount of the touch sensor is decreased.

Thus, the preset period may be set so that a sensing speed with respect to taps (touch input) applied onto the display unit 151 can be high enough not to be recognized by a user, and so that power consumption can be reduced. For instance, the preset period may be set so that the touch sensor in a deactivated state can be activated about 20 times (1 Hz) per second.

While the display unit 151 is in an activated state, the touch sensor may be also in an activated state. In an activated state, the touch sensor may have an activation period (T) of '0' or a value very close to '0'. Alternatively, in an activated state, the touch sensor may have an activation period (T) much shorter than that set in a deactivated state of the display unit 151, by several times. That is, the touch sensor may be activated with a different period, according to whether the display unit 151 is in an activated state or a deactivated state.

In a doze mode where the display unit 151 is in a deactivated state and the touch sensor is periodically activated, if a preset touch input (first and second touch inputs consecutively applied onto a predetermined region within a reference time, e.g., a 'knock-knock' touch input) is sensed by the touch sensor, the controller 180 may convert the doze mode into an activate mode where the display unit and the touch sensor are activated.

Moreover, the touch sensor may be driven at a different period according to a state of the display unit 151. For instance, the touch sensor may execute a doze mode when the display unit 151 is in a closed state, and execute an active mode when the display unit 151 is converted from a closed state to an open state.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the mobile terminal 100 disclosed herein may be provided with a bar-type terminal body. However, the present invention is not limited to this, but is also applicable to various structures such as watch type, clip type, glasses type or folder type, flip type, slide type, swing type, swivel type, or the like, in which two and more bodies are combined with each other in a relatively movable manner. Discussion herein will often relate to a particular type of mobile terminal. However, such teachings with regard to a particular type of mobile terminal will generally apply to other types of mobile terminals as well.

In this instance, the terminal body may be understood as a concept considering the mobile terminal 100 as at least one assembly.

The mobile terminal 100 may include a case (casing, housing, cover, etc.) forming the appearance of the terminal. As shown in the figures, the mobile terminal 100 may include a front case 101 and a rear case 102. Various electronic components may be incorporated into a space formed between the front case 101 and the rear case 102. At least one middle case may be additionally disposed between the front case 101 and the rear case 102.

A display unit 151 may be disposed on a front surface of the terminal body to output information. As illustrated, a window 151a of the display unit 151 may be mounted to the front case 101 so as to form the front surface of the terminal body together with the front case 101.

In some instances, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. Further, the rear cover 103 may include an opening for externally exposing a camera 12b or an audio output unit 152b.

The cases 101, 102, and 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may have a display unit 151, first and second audio output units 152a and 152b, a proximity sensor 141, an illumination sensor 142, an optical output unit 154, first and second cameras 121a and 121b, first and second manipulation units 123a and 123b, a microphone 122, an interface unit 160, and the like.

Hereinafter, description will be given, as illustrated in FIGS. 1B and 1C, of an exemplary embodiment of a mobile terminal, in which the display unit 151, the first audio output unit 152 a, the proximity sensor 141, the illumination sensor 142, the optical output unit 154, the first camera 121a, and the first manipulation unit 123a are disposed on a front surface of a terminal body, the second manipulation unit 123b, the microphone 122, and the interface unit 160 are disposed on a side surface of the terminal body, and the second audio output unit 152b and the second camera 121b are disposed on a rear surface of the terminal body.

However, the components are not limited to this configuration. The components may be excluded, replaced, or disposed on other surfaces as needed. For example, the first manipulation unit 123a may not be provided on the front surface of the terminal body, and the second audio output unit 152b may be provided on the side of the terminal body, rather than on the rear surface of the terminal body.

The display unit 151 may display (or output) information processed in the mobile terminal 100. For example, the display unit 151 may display execution screen information of an application program running on the mobile terminal 100, or user interface (UI) information or graphic user interface (GUI) information according to the execution screen information.

The display unit 151 may include at least one among a liquid crystal display (LCD), a thin film transistor-liquid crystal display (TFT-LCD), an organic light emitting diode (OLED), a flexible display, a 3-dimensional (3D) display, and an e-ink display.

Two or more display units 151 may be used according to implementation of the mobile terminal 100. For instance, a plurality of the display units may be arranged on one side of the mobile terminal 100, either spaced apart from each other or integrated, or these display units may be arranged on different surfaces of the mobile terminal 100.

The display unit 151 may also include a touch sensor which senses a touch input received at the display unit 151 so as to receive a control command in a touching manner. When a touch is input to the display unit 151, the touch sensor may be configured to sense this touch and the controller 180 may generate a control command corresponding to the touch. The content input in the touching manner may be text or numbers, or a menu item which can be indicated or specified in various modes.

The touch sensor may be configured in the form of a film having a touch pattern, disposed between the window 151a and a display (not shown) on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touchscreen together with the touch sensor. Here, the touchscreen may serve as the user input unit 123 (see FIG. 1A). Therefore, the touchscreen may replace at least some of the functions of the first manipulation unit 123a.

The first audio output unit 152a may be implemented in the form of a receiver to deliver telephone conversation to ears of a user, and the second audio output unit 152b may be implemented in the form of a loud speaker to output various alarm sounds, multimedia audio reproduction sounds, and the like.

The window 151a of the display unit 151 may include an audio hole to allow sound generated by the first audio output unit 152a to pass. However, the present invention is not limited thereto and sound may be released along an assembly gap between the structural bodies (for example, a gap between the window 151a and the front case 101). In this case, a hole independently formed to output sound may not be seen or is otherwise hidden in terms of appearance, thereby further simplifying the appearance of the mobile terminal 100.

The optical output unit 154 can be configured to output light for indicating event generation. Examples of such events include message reception, call signal reception, a missed call, an alarm, a schedule notice, email reception, information reception through an application, and the like. When a user has checked a generated event, the controller 180 can control the optical output unit 154 to stop light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by the user in order to receive a command for controlling operation of the mobile terminal 100. The first and second manipulation units 123a and 123b may also be commonly referred to as a manipulation portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

Although the first manipulation unit 123a is a touch key in this figure, the present invention is not limited thereto. For example, the first manipulation unit 123a may include a push key (mechanical key) or a combination of a push key and a touch key.

Input received at the first and second manipulation units 123a and 123b may be used in various ways. For example, the first manipulation unit 123a may receive commands such as a menu, home key, cancel, search, or the like, and the second manipulation unit 123b may receive commands for controlling a volume level output from the first and second audio output units 152a and 152b and switching a touch recognition mode of the display unit 151.

As another example of the user input unit 123, a rear input unit (not shown) may be located on the rear surface of the terminal body. The rear input unit can be manipulated by a user to receive commands for controlling operation of the mobile terminal 100. The received commands may be set in a variety of different ways. For example, a command such as power on/off, start, end or scroll, a command for controlling a volume level output from the first and second audio output units 152a and 152b, a command for switching to a touch recognition mode of the display unit 151, and the like may be received. The rear input unit may be configured to permit touch input, push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate the same using a forefinger when the user grabs the terminal body with one hand. The present invention is not limited thereto and the position of the rear input unit may be changed.

If the rear input unit is provided located on the rear surface of the terminal body, a new user interface using the same may be implemented. In addition, the above-described touchscreen or rear input unit may replace at least some of the functions of the first manipulation unit 123a located on the front surface of the terminal body. As such, if the first manipulation unit 123a is not located on the front surface of the terminal body, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may be embedded in the display unit 151 or the user input unit 123.

The microphone 122 receives user's voice or the other sounds. If desired, multiple microphones 122 may be provided to receive stereo sound.

The interface unit 160 may serve as an interface between the mobile terminal 100 and external devices. For example, the interface unit 160 may include at least one among a connection terminal for connecting to another device (for example, an earphone, an external speaker, or the like), a port for near field communication (for example, an Infrared Data Association (IrDA) port, a Bluetooth port, a wireless LAN port, and the like), and a power supply terminal for supplying power to the mobile terminal 100. The interface unit 160 may be implemented in the form of a socket for accommodating an external card, such as a Subscriber Identity Module (SIM), a User Identity Module (UIM), or a memory card for information storage.

The second camera 121b may be located at the rear side of the terminal body. In this case, the second camera 121b may capture images in a direction that is substantially opposite to that of the first camera unit 121a.

The second camera 121b may include a plurality of lenses arranged along at least one line. The plurality of lenses may also be arranged in a matrix. The cameras may be referred to as an "array camera." When the second camera 121b is implemented as an array camera, images may be captured in various manners using the plurality of lenses, and images with better quality may be acquired.

A flash 124 may be provided adjacent to the second camera 121b. When an image of a subject is captured with the camera 121b, the flash 124 may illuminate the subject.

The second audio output unit 152b may be further located on the terminal body. The second audio output unit 152b may implement stereophonic sound functions in conjunction with the first audio output unit 152a, and may be also used to implement a speakerphone mode for call communication.

At least one antenna for wireless communication may be located on the terminal body. The antenna may be installed in the terminal body or formed in the case. For example, an antenna which configures a part of the broadcast receiving module 111 (see FIG. 1A) may be retractable into the terminal body. Alternatively, an antenna may be formed in a film shape to be attached to an inner surface of the rear cover 103, or a case including a conductive material may function as an antenna.

The terminal body includes a power supply (190; see FIG. 1A) for supplying power to the mobile terminal 100. The power supply 190 may include a battery 191, which is mounted in the terminal body or detachably coupled to the outside of the terminal body.

The battery 191 may receive power via a power source cable connected to the interface unit 160. Also, the battery 191 can be recharged in a wireless manner using a wireless charger. Wireless charging may be implemented by magnetic induction or resonance (magnetic resonance).

In the figures, the rear cover 103 is coupled to the rear case 102 to shield the battery 191, to prevent separation of the battery 191, and to protect the battery 191 from external impact or from foreign materials. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, exemplary embodiments related to a control method that may be implemented in the mobile terminal configured as described above will be described with reference to the accompanying drawings. It will be apparent to those skilled in the art that modifications and variations can be made without departing from the spirit and scope of the invention.

Figure 2:
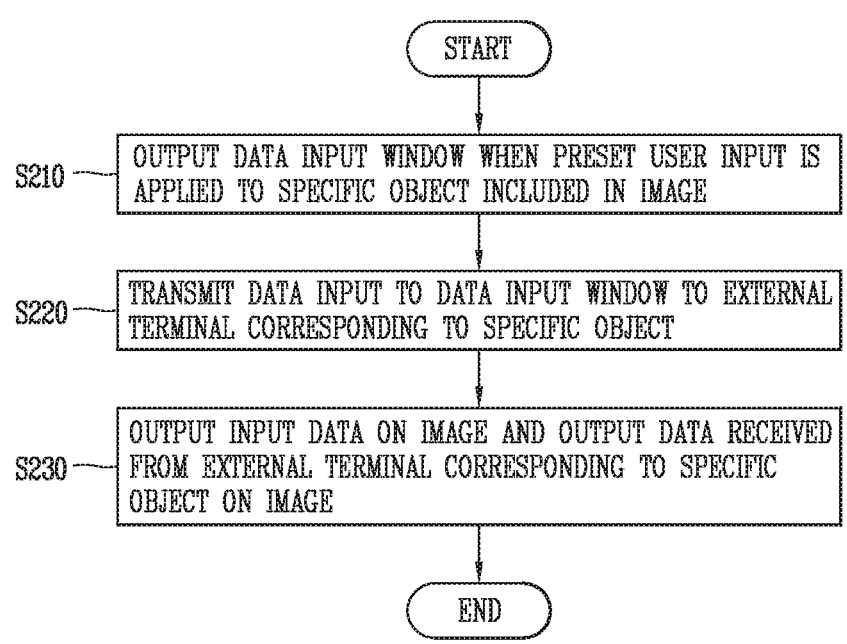
FIG. 2 is a flowchart illustrating a method of controlling a mobile terminal according to the present invention.

FIG. 2 is a flowchart illustrating a method of controlling a mobile terminal according to the present invention.

Referring to FIG. 2, first, an image including a specific object is output, and when a preset user input is applied to the specific object, a data input window is output (S210).

Specifically, the specific object may include various objects such as a person, an animal, and an object. In addition, the data input window may include a touch keyboard for inputting characters, numbers, symbols, etc., an icon for attaching data, an output window for outputting contents input by the touch keyboard, and the like. That is, the data input window refers to a user interface output for creating a message to be transmitted when a message transmission application is executed.

In an embodiment, when a person is included in a photo image (i.e., a picture image or a photograph image) stored in a photo album, a long touch input may be applied to the face of the person. Accordingly, the data input window may be output.

Subsequently, when data is input to the data input window, the input data is transmitted to an external terminal corresponding to the specific object (S220).

Specifically, the external terminal corresponding to the specific object may be an external terminal detected to be related to the specific object and may be detected by stored data or data previously set by the user. To this end, the user may store information related to the specific object in the image.

In addition, the external terminal may be a mobile terminal such as a mobile phone, a smartphone, a laptop computer, a digital broadcasting terminal, a personal digital assistant (PDA), a portable multimedia player (PMP), a navigation device, a slate PC, a tablet PC, an ultrabook, or a wearable device (e.g., a smartwatch, a glass-type terminal (smart glass), a head mounted display (HMD)), or a stationary terminal such as a digital TV, a desktop computer, a digital signage, and the like.

In an embodiment, when the specific object is a person, the input data may be transmitted to a mobile terminal that the person uses. To this end, the person is identified by a face recognition algorithm, and the number of the mobile terminal used by the identified person may be detected from an address book or the like.

In another embodiment, when the specific object is an object, another image taken together when the image containing the object was captured may be searched. Then, a person included in the searched image may be detected, and the input data may be transmitted to the mobile terminal that the person uses.

In another embodiment, the mobile terminal used by the person may be detected based on tag information (person name, etc.) stored in the image.

Thereafter, the input data is output on the image, and when data is received from the external terminal, the received data is output on the image (S230).

That is, data to be transmitted and received to and from the external terminal may be output on the image. In an example, a transmitted message and a received message may be distinguished by a speech bubble and output on the image, like a conversion screen of a messenger application.

Hereinafter, specific embodiments will be described.

In an embodiment, the step S230 may include switching the image to another image that is detected based on data related to the image, when a preset event occurs.

In another embodiment, the step S230 may include switching the image containing the specific person to another image including the specific person at every preset period.

In another embodiment, the step S230 may include switching the image to another image that is detected based on a position and time at which the image was captured at every preset period.

In another embodiment, the step S230 may include switching the image to another image that is detected based on the specific data, based on transmitting and receiving specific data to and from the external terminal.

In another embodiment, the step S230 may include switching, based on the user input for selecting at least one of a plurality of images detected based on data related to the image, the image to the at least one selected image.

In another embodiment, the step S230 may include outputting, based on a preset user input applied to schedule information stored in a schedule application, outputting data transmitted to and received from the external terminal corresponding to the schedule information, on an execution screen of the schedule application.

In another embodiment, the step S230 may include outputting, based on a preset user input applied to an image including a plurality of specific objects, data transmitted to and received from a plurality of external terminals respectively corresponding to the plurality of specific objects, on the image.

In another embodiment, the step S230 may include outputting, based on a user input applied to select at least one of the plurality of specific objects, data transmitted to and received from at least one external terminal respectively corresponding to the at least one selected object, on the image.

In another embodiment, the step S210 may include detecting an external terminal corresponding to the specific object based on data related to the image or data input by the user.

Hereinafter, specific embodiments will be described in the aspect of components.

The display unit 151 may output an image including a specific object and, and when a preset user input is applied to the specific object, the display unit may output a data input window.

When data is input to the data input window, the wireless communication unit 110 may transmit the input data to an external terminal corresponding to the specific object.

The controller 180 may output the input data on the image and, when data is received from the external terminal, the controller 180 may output the received data on the image.

In an embodiment, when a preset event occurs, the controller 180 may switch the image to another image that is detected based on data related to the image.

In another embodiment, the controller 180 may switch the image including the specific person to another image including the specific person at every predetermined period.

In another embodiment, the controller 180 may switch the image to another image that is detected based on a position and time at which the image was captured, at every predetermined period.

In another embodiment, when specific data is transmitted and received to and from the external terminal, the controller 180 may switch the image to another image that is detected based on the specific data based on the specific data.

In another embodiment, when a user input for selecting at least one of a plurality of images detected based on data related to the image is applied, the controller 180 may switch the image to the at least one selected image.

In another embodiment, when a preset user input is applied to schedule information stored in a schedule application, the controller 180 may output data transmitted to and received from the external terminal corresponding to the schedule information on an execution screen of the schedule application.

According to another embodiment, when a preset user input is applied to an image including a plurality of specific objects, the controller 180 may output data transmitted to and received from a plurality of external terminals respectively corresponding to the plurality of specific objects, on the image.

In another embodiment, when a user input for selecting at least one of the plurality of specific objects is applied, the controller 180 may output data transmitted to and received from at least one external terminal corresponding to each of the at least one selected object, on the image.

In another embodiment, based on data related to the image or data input by the user, the controller 180 may detect an external terminal corresponding to the specific object.

Figure 3:
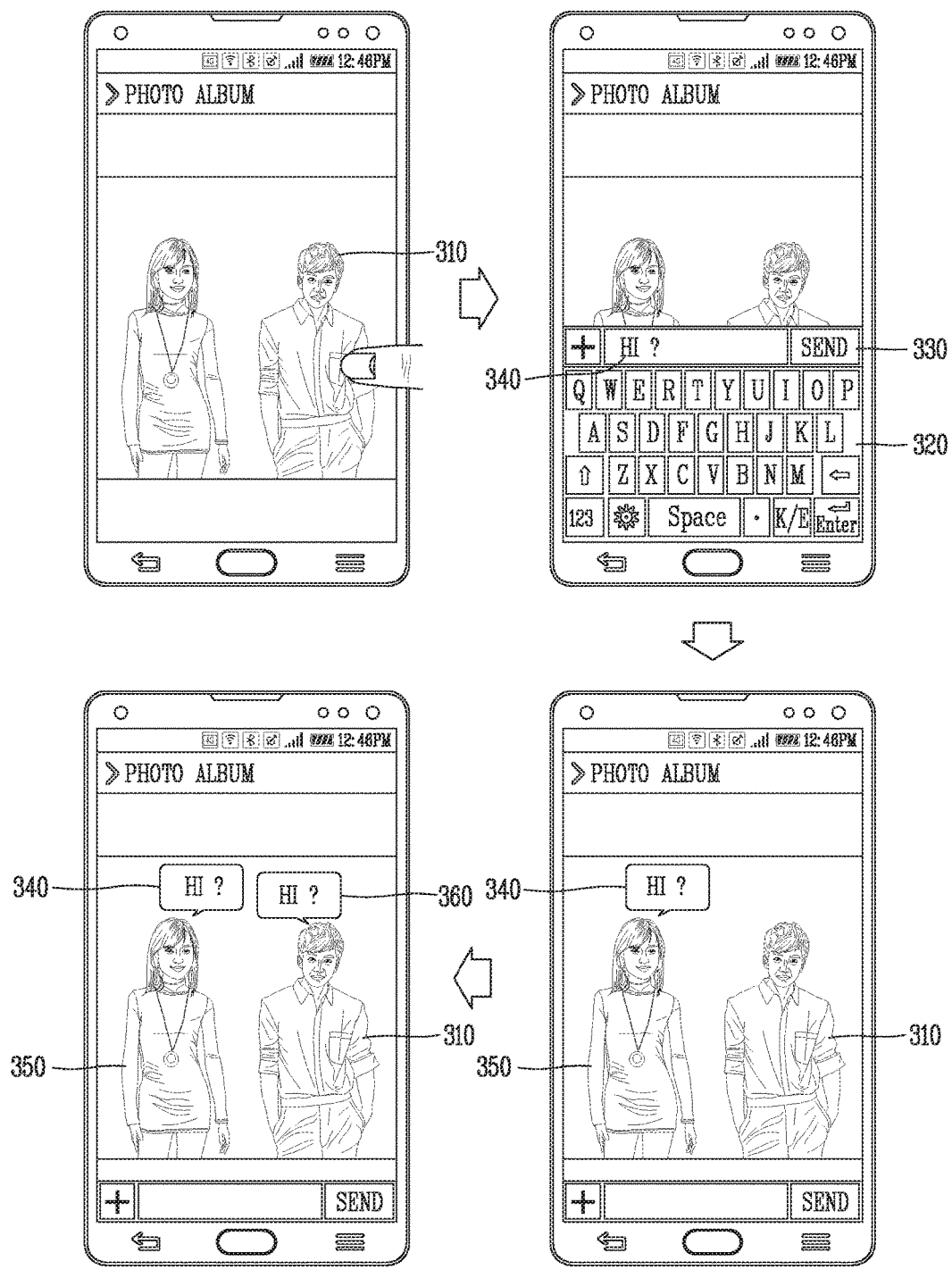
FIG. 3 is a conceptual view illustrating an embodiment in which a user exchanges messages with a person included in an image, while sharing the image.

FIG. 3 is a conceptual view illustrating an embodiment in which the user exchanges messages with a person included in an image, while sharing the image.

Referring to FIG. 3, when a touch input is applied to a first person 310 included in a photo image stored in a photo album, a touch panel 320 for creating a message and an output window 330 to which a created image may be output may be output on a lower portion of the screen 151. Accordingly, when the user creates a message 340, the message 340 may be output on the output window 330.

In another embodiment, when a pinch-out input is applied to the first person 310, a touch panel 320 for creating a message and an output window 330 to which a created image may be output may be output on a lower portion of the screen 151. Accordingly, when the user creates a message 340, the message 340 may be output on the output window 330.

Here, the photo image may be reduced to be output so that the photo image may not be covered by the output of the touch panel 320.

The created message 340 may be transmitted to a first terminal used by the first person 310. To this end, the name or an ID of the first person 310 may be detected from tag information stored in the photo image, and the number of the first terminal used by the first person 310 may be searched from an address book.

In another embodiment, the tag information may be stored by photo images or may be stored by persons included in the photo image. That is, when a plurality of persons (or a plurality of people) exist in the photo image, separate tag information may be set for each person.

In another embodiment, the first person 310 may be identified using a face recognition algorithm and the number of the first terminal, or the like, used by the first person 310 may be searched from the address book by the name or an ID of the identified first person 310.

Also, a sent message 340 may be output on the photo image. In an embodiment, if the photo image includes the user 350 of the terminal 100 as well, the sent message 340 may be output within a speech bubble of the user 350.

Thereafter, when a message 360 is received from the first terminal, the received message 360 may be output in a speech bubble of the first person 310. That is, messages exchanged with the counterpart (first person) may continue to be output to the speech bubble.

In another embodiment, when a long touch input is applied to the first person 310, data previously exchanged with the first person 310 and time at which the data was transmitted and received may be output.

In another embodiment, when a touch input (double tap) of successively tapping the first person 310 is applied to the first person 310, the number of images including the first person 310, whether the corresponding image is stored in the terminal used by the first person, and the like, may be output.

In another embodiment, a conversation counterpart may be added by applying a touch input to an icon for adding a conversation counterpart. Specifically, when a touch input is applied to the icon, an address book may be output and a conversation counterpart may be directly selected.

Alternatively, a person stored in another image captured at the same place as the photo image may be recommended as a conversation counterpart.

Meanwhile, when a preset event occurs, the controller 180 may switch the image to another image that is detected based on data related to the image.

The preset event may include the lapse of a preset time, a case where data is input or received again, a case where a command for switching an image is input, and the like.

Hereinafter, in the embodiments, the photo images are switched one by one, but the present invention is not limited thereto. In another embodiment, the screen 151 may be divided into two regions and the contents of messages exchanged on the first image may be output in one region and the content of the messages exchanged on the second image related to the first image may be output in the remaining region.

In another embodiment, the controller 180 may switch the image including the specific person to another image including the specific person at every predetermined period.

Figure 4:
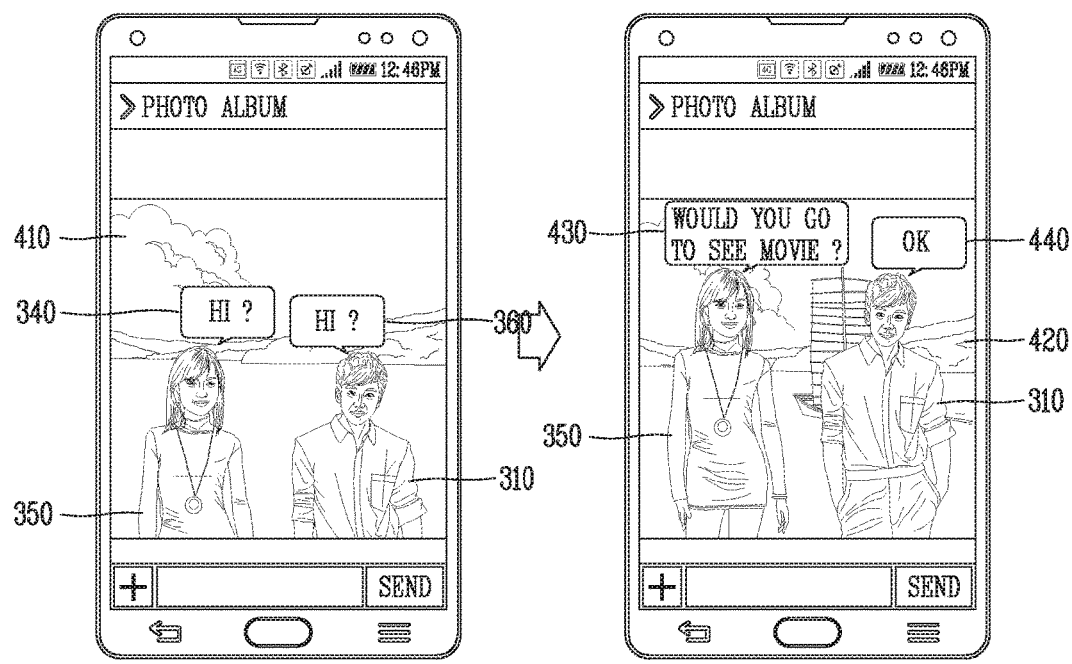
FIG. 4 is a conceptual view illustrating an embodiment in which an image shared in FIG. 3 is switched.

FIG. 4 is a conceptual view illustrating an embodiment in which an image shared in FIG. 3 is switched.

Referring to FIG. 4, in case where the user 350 of the terminal 100 and the first person 310 are output on the first image 410, messages 340 and 360 exchanged with each other may be output in speech bubbles.

Specifically, the message 340 transmitted by the user 350 may be output in the speech bubble of the user 350, and the message 360 received from the first terminal used by the first person 310 may be output in the speech bubble of the first person 310. That is, messages exchanged with the first person 310 may continue to be output in the speech bubbles.

Here, when a preset time has lapsed, the first image 410 may be switched to a second image 420, which is another image including the first person 310. In addition, messages exchanged with the first person 310 may continue to be output in the speech bubbles. Specifically, a message 430 transmitted by the user 350 may be output in the speech bubble of the user 350 and a message 440 received from the first terminal used by the first person 310 may be output In the speech bubble of the first person 310.

In another embodiment, when a command for switching an image is input, the first image 410 may be switched to the second image 420. For example, a separate icon for switching the image may be output, and when a touch input is applied to the icon, the image may be switched.

In another embodiment, when a new message is sent or received, the first image 410 may be switched to the second image 420.

In another embodiment, only a background image of the first person 310 and the user 350 may be changed, while the initial output state of the first person 310 and the user is maintained.

Meanwhile, detection of the second image 420 may be performed by information previously set by the user or by a face recognition algorithm. For example, the tag information corresponding to the second image 420 may include the name of the first person 310, an ID, and the like. It may also be detected by the face recognition algorithm that the first person 310 is included in the second image 420.

In another embodiment, the face of the user of the terminal 100 may be stored (registered) by the camera 121 of the terminal 100 or by the user's input.

In this manner, a plurality of image lists including the first person 310 may be detected. It is also detectable regardless of whether the images are stored in the same folder or not. That is, the first image 410 and the second image 420 may be stored in different folders, respectively.

Meanwhile, the controller 180 may detect an external terminal corresponding to the specific object, based on data related to the image or data input by the user.

Figure 5:
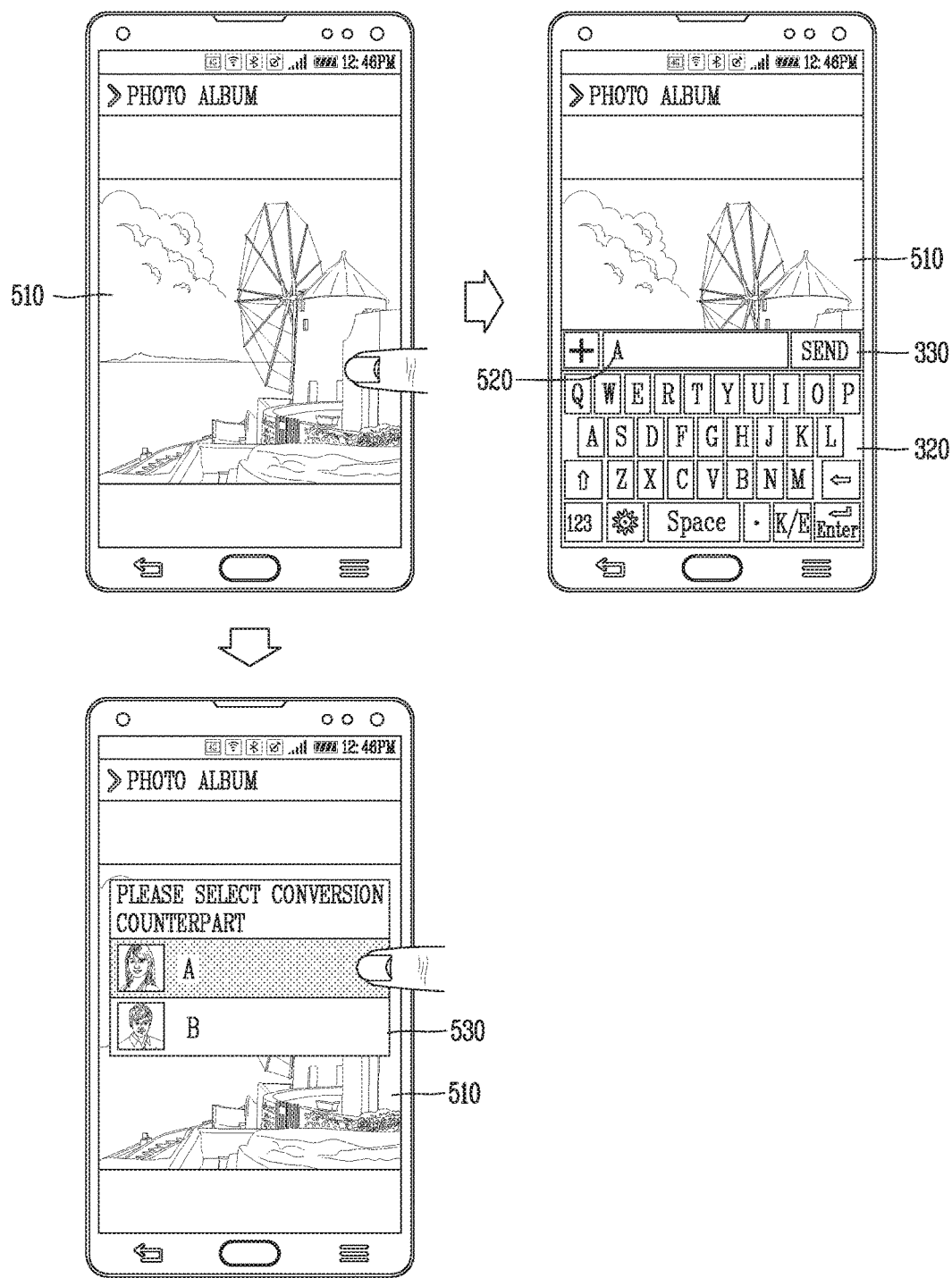
FIG. 5 is a conceptual view illustrating an embodiment in which a conversation counterpart is selected.

FIG. 5 is a conceptual view illustrating an embodiment in which a conversation counterpart is selected.

Referring to FIG. 5, when a touch input is applied to a landscape photo image 510 that does not include a person, a touch panel 320 for creating a message and an output window 330 outputting a message being created are displayed at a lower portion of the screen 151.

Accordingly, the terminal of a counterpart to which the created message is to be transmitted may be detected according to various embodiments.

For example, photo images captured together may be detected based on a time, a location, and the like, at which the landscape photograph image 510 was captured. Subsequently, a person included in the detected photo images may be identified, and a mobile terminal used by the person may be detected from an address book, or the like.

In another embodiment, the mobile terminal used by the person may be detected from the address book, or the like, from tag information such as the name, address, and ID of the person corresponding to the landscape photo image 510.

In another embodiment, the user may input the party A to which the message is to be transmitted. Specifically, the terminal of the counterpart A to which the message is to be transmitted may be detected from the address book, or the like, from the name 520 of the counterpart to which the message input through the touch keyboard is to be sent.

In another embodiment, when a plurality of persons are detected from the time, location, tag information, etc., at which the landscape photo image 510 was captured, a pop-up window 530 that allows the user to select a counterpart to which the message is to be sent may be output.

In the pop-up window 530, a menu corresponding to each of a plurality of persons may be output. In this case, an external terminal to which a message is to be sent may be selected by applying a touch input to the menu corresponding to the counterpart A to which the message is to be sent. Here, each menu may include names, contact numbers, photographs, etc. of the plurality of persons.

Meanwhile, the controller 180 may switch the image to another image that is detected based on a location and time at which the image was captured, at every predetermined period.

Figure 6:
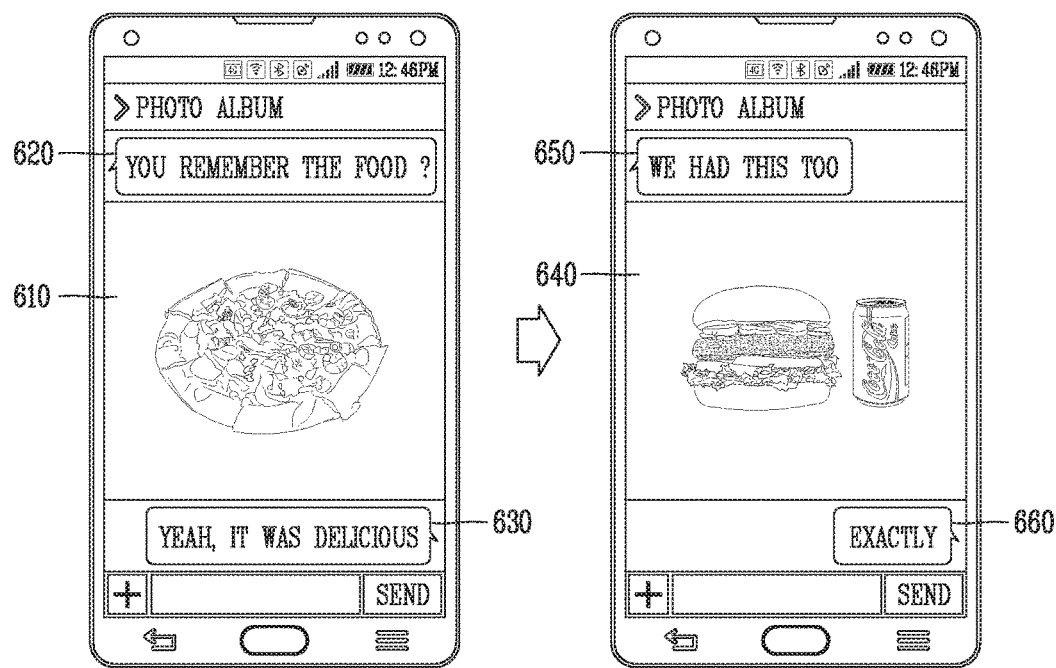
FIG. 6 is a conceptual view illustrating an embodiment in which a shared image is switched based on information related to the image.

FIG. 6 is a conceptual view illustrating an embodiment in which a shared image is switched based on information related to an image.

Referring to FIG. 6, according to the above-described embodiments, in a state in which a first image 610 is output, messages may be exchanged with a counterpart detected in relation to the first image 610.

Specifically, in order to minimize a covered region of the first image 610, the message 620 sent from the counterpart may be output in a speech bubble at the upper left end of the screen 151 and a message 630 sent to the counterpart may be output in a speech bubble at the lower right end of the screen 151.

In an embodiment, when a predetermined time has lapsed, the first image 610 may be switched to a second image 640, which is another image. Also, messages exchanged with the counterpart may continue to be output in a speech bubble. Specifically, a message 660 sent to the counterpart is output in the speech bubble at the lower right end of the screen 151, and a message 650 sent from the counterpart may be output in the speech bubble at the upper left end of the screen 151.

In another embodiment, when a command for switching an image is input, the first image 610 may be switched to the second image 640. For example, a separate icon for switching the image may be output, and when a touch input is applied to the icon, the image may be switched.

In another example, if a new message is sent or received, the first image 610 may be switched to a second image 640. That is, the image may be switched each time the message in the speech bubble changes.

Meanwhile, detection of the second image 640 may be performed based on information previously set by the user, a location and time at which the second image 640 was captured, and the like. For example, the tag information of the second image 640 may include the name or ID of the conversation counterpart, the same place as the tag information of the first image 610, and the like.

In another example, the second image 640 may be an image which was captured in the same location where the first image 610 was captured or may be an image which was captured in a location close to a location where the first image 610 was taken.

In another example, the second image 640 may be an image which was capture some minutes before or after the first image 610 was captured.

In this manner, a plurality of image lists associated with the first image 610 may be detected. Also, images may be detected regardless of whether the images are stored in the same folder. That is, the first image 610 and the second image 640 may be stored in different folders, respectively.

Meanwhile, on the basis of transmission and reception of specific data to and from the external terminal, the controller 180 may switch the image to another image that is detected based on the specific data.

Figure 7:
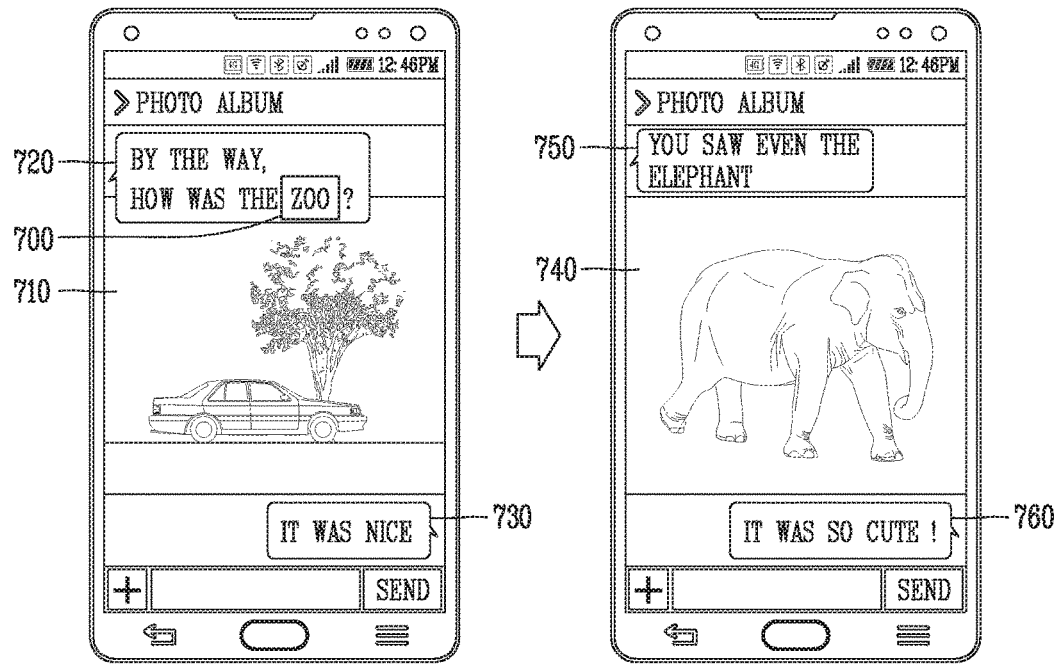
FIG. 7 is a conceptual view illustrating an embodiment in which a shared image is switched based on exchanged data.

FIG. 7 is a conceptual view illustrating an embodiment in which a shared image is switched based on exchanged data.

Referring to FIG. 7, according to the embodiments described above, in a state in which the first image 710 is output, messages may be exchanged with the counterpart detected in relation to the first image 710.

Specifically, in order to minimize a covered region of the first image 710, a message 720 sent from the counterpart may be output in a speech bubble at the upper left end of the screen 151 and a message 730 transmitted to the counterpart may be output in a speech bubble at a lower right end of the screen 151.

In an embodiment, when a preset time has lapsed, the first image 710 may be switched to the second image 740, which is another image. Also, messages exchanged with the counterpart may continue to be output to in the speech bubble. Specifically, a message 760 sent to the counterpart is output in the speech bubble at the lower right end of the screen 151, and a message 750 sent from the counterpart may be output in the speech bubble at the upper left end of the screen 151.

In another embodiment, when a command for switching an image is input, the first image 710 may be switched to the second image 740. For example, a separate icon for switching the image may be output, and the image may be switched if a touch input is applied to the icon.

In another example, when a new message is sent or received, the first image 710 may be switched to the second image 740. That is, the image may be switched each time the message in a speech bubble changes.

Meanwhile, detection of the second image 740 may be performed based on data exchanged between the user and the conversation counterpart. The data may be a preset keyword or image information.

In an example, if a specific place 700 is mentioned during the conversation, a second image 740 captured at the specific place 700 may be detected.

In another example, if the name of a specific person is mentioned during the conversation, a second image 740 containing the person may be detected.

In another example, in case of transmitting a specific image during the conversation, the second image 740 associated with the transmitted image may be detected. Specifically, the second image 740 may be captured at the same place as the transmitted image, or may be an image captured within a near time.

In this manner, a plurality of image lists associated with the first image 710 may be detected. The plurality of image lists may be detected regardless of whether the images are stored in the same folder. That is, the first image 710 and the second image 740 may be stored in different folders, respectively.

Meanwhile, when a user input for selecting at least one of a plurality of images detected on the basis of data related to the image is applied, the controller 180 may switch the image to the selected at least one image.

Figure 8:
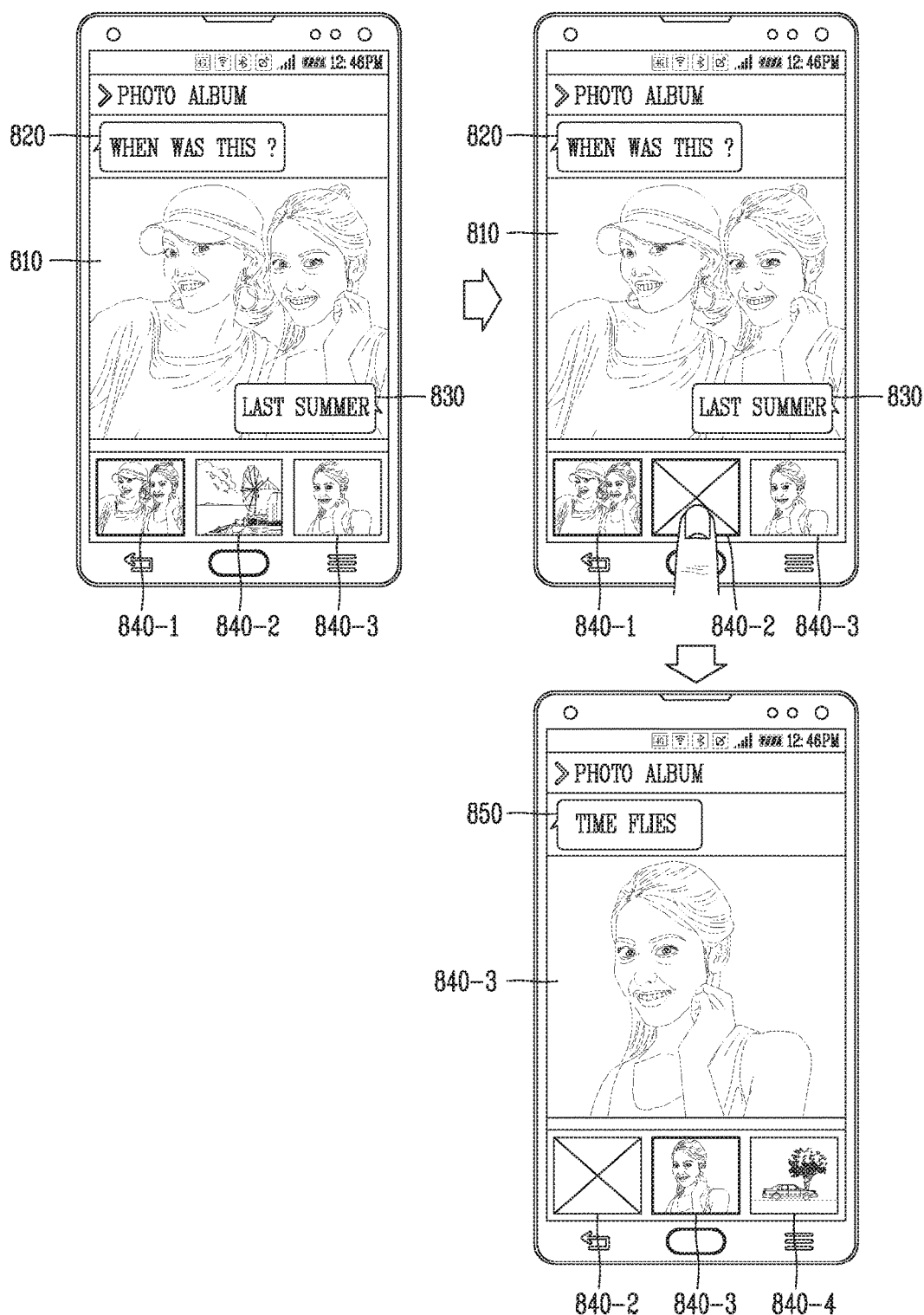
FIGS. 8 and 9 are conceptual views illustrating an embodiment in which a shared image is switched according to user selection.
Figure 9:
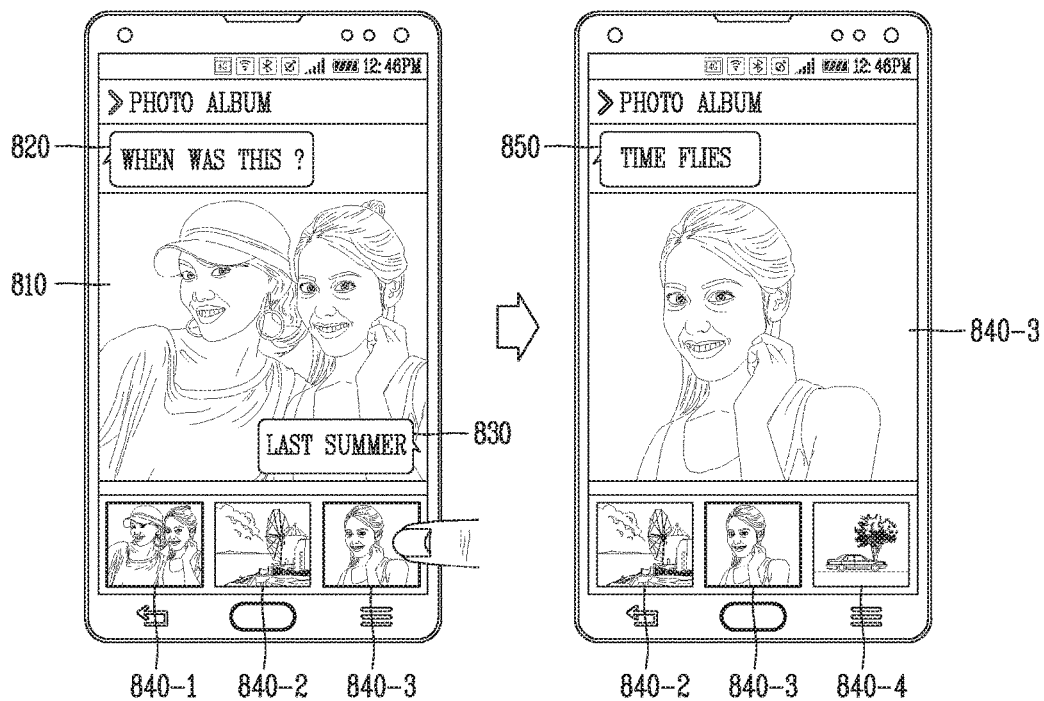

FIGS. 8 and 9 are conceptual views illustrating an embodiment in which an image shared by a user is switched.

Referring to FIG. 8, according to the above-described embodiments, in a state in which a first image 810 is output, messages may be exchanged with a counterpart detected in association with the first image 810.

Specifically, a message 820 sent from the counterpart may be output in a speech bubble at the upper left of the screen 151, and a message 830 sent to the counterpart may be output in a speech bubble at the lower right of the screen 151. In an embodiment, the speech bubbles may be output in positions where the area covered by the first image 810 is minimized.

Also, a plurality of images 840-1, 840-2, and 840-3, which are detected based on data associated with the first image 810, may be output at the lower end of the screen 151. That is, the plurality of images 840-1, 840-2, and 840-3 that may be switched may be output according to tag information, a photographing time, a photographing location, whether or not the conversation counterpart is included, and the like.

In an embodiment, an image (first image, background image) as a background of exchanged conversation may be switched at every preset period in order in which the plurality of images 840-1, 840-2, and 840-3 are output. Specifically, after a predetermined time has lapsed, the first image 810 may be switched to the second image 840-2, and the second image 840-2 may be switched to the third image 840-3.

In another example, when a long touch input is applied to the second image 840-2 output at a lower end of the screen 151, the second image 840-2 may be deleted from the switchable background image. Specifically, after a predetermined time has lapsed, the first image 810 may be switched to the third image 840-3 output next to the second image 840-2.

Also, a fourth image 840-4 switchable next to the third image 840-3 may be output at the lower end of the screen 151 and a newly received message 850 may be displayed on the third image 840-3.

That is, according to the embodiment of FIG. 8, a picture which is not desired to be shared with the conversation counterpart may be excluded.

In another embodiment, referring to FIG. 9, in a state in which the first image 810 is output, messages may be exchanged with the counterpart detected in relation to the first image 810 as described above with reference to FIG. 8.

Specifically, the message 820 sent from the counterpart may be output in the speech bubble at the upper left of the screen 151, and the message 830 sent to the counterpart may be output in the speech bubble at the lower right of the screen 151. In an embodiment, the speech bubbles may be output in a position where the area covered by the first image 810 is minimized.

Also, a plurality of images 840-1, 840-2, and 840-3, which are detected based on data associated with the first image 810, may be output at the lower end of the screen 151. That is, the plurality of images 840-1, 840-2, and 840-3 that may be switched may be output according to tag information, a photographing time, a photographing location, whether or not the conversation counterpart is included, and the like.

In an embodiment, an image (first image, background image) as a background of exchanged conversation may be switched at every preset period in order in which the plurality of images 840-1, 840-2, and 840-3 are output. Specifically, after a predetermined time has lapsed, the first image 810 may be switched to the second image 840-2, and the second image 840-2 may be switched to the third image 840-3.

In another example, when a touch input is applied to the third image 840-3 output at the lower end of the screen 151, the background image is switched from the first image 810 to the third image 840-3.

Also, a fourth image 840-4 switchable next to the third image 840-3 may be output at the lower end of the screen 151 and a newly received message 850 may be displayed on the third image 840-3.

That is, according to the embodiment of FIG. 9, photographs and the order in which the photographs desired to be shared with the conversation counterpart are output may be selected.

Meanwhile, based on a preset user input applied to schedule information stored in a schedule application, the controller 180 may output data transmitted to or received from an external terminal corresponding to the schedule information on an execution screen of the schedule application.

Figure 10:
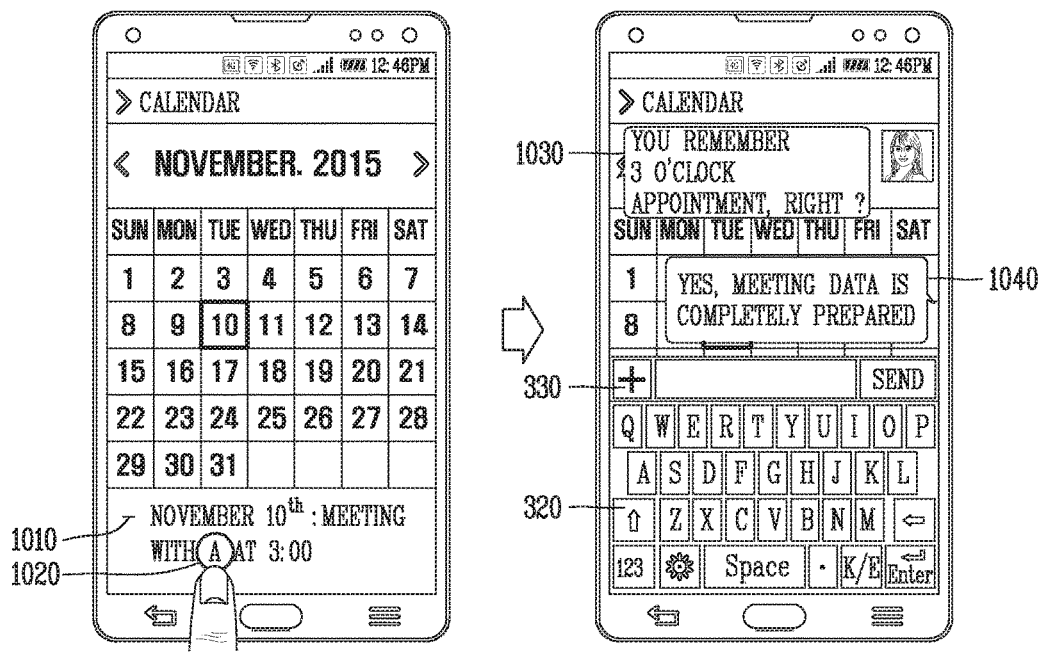
FIG. 10 is a conceptual view illustrating an embodiment in which a user exchanges messages with a counterpart stored in schedule information, while sharing an image with the counterpart.

FIG. 10 is a conceptual view illustrating an embodiment in which a user exchanges messages with a counterpart stored in schedule information, while sharing an image with the counterpart.

Referring to FIG. 10, when a long touch input is applied to a meeting counterpart 1020 in the schedule information 1010 stored in a schedule application, a touch keyboard 320 for creating a message and an output window 330 may be output at a lower portion of the screen 151. Accordingly, when the user creates a message 1030, the message 1030 may be output to the output window 330.

In addition, the created message 1030 may be transmitted to a terminal used by the meeting counterpart 1020. To this end, the number of the terminal used by the meeting counterpart 1020 may be searched from the address book or the like.

Accordingly, the message 1030 transmitted to the terminal of the meeting counterpart 1020 and a message 1040 received from the terminal of the meeting counterpart 1020 may be output on the execution screen of the schedule application. That is, messages exchanged with the meeting counterpart 1020 may continue to be output on the execution screen of the schedule application.

In another example, if the schedule information is not stored in the terminal of the meeting counterpart 1020, the schedule information may be transmitted.

Meanwhile, on the basis of a predetermined user input applied to an image including the plurality of specific objects, the controller 180 may output data transmitted to and received from a plurality of external terminals respectively corresponding to the plurality of specific objects, on the image.

Figure 11:
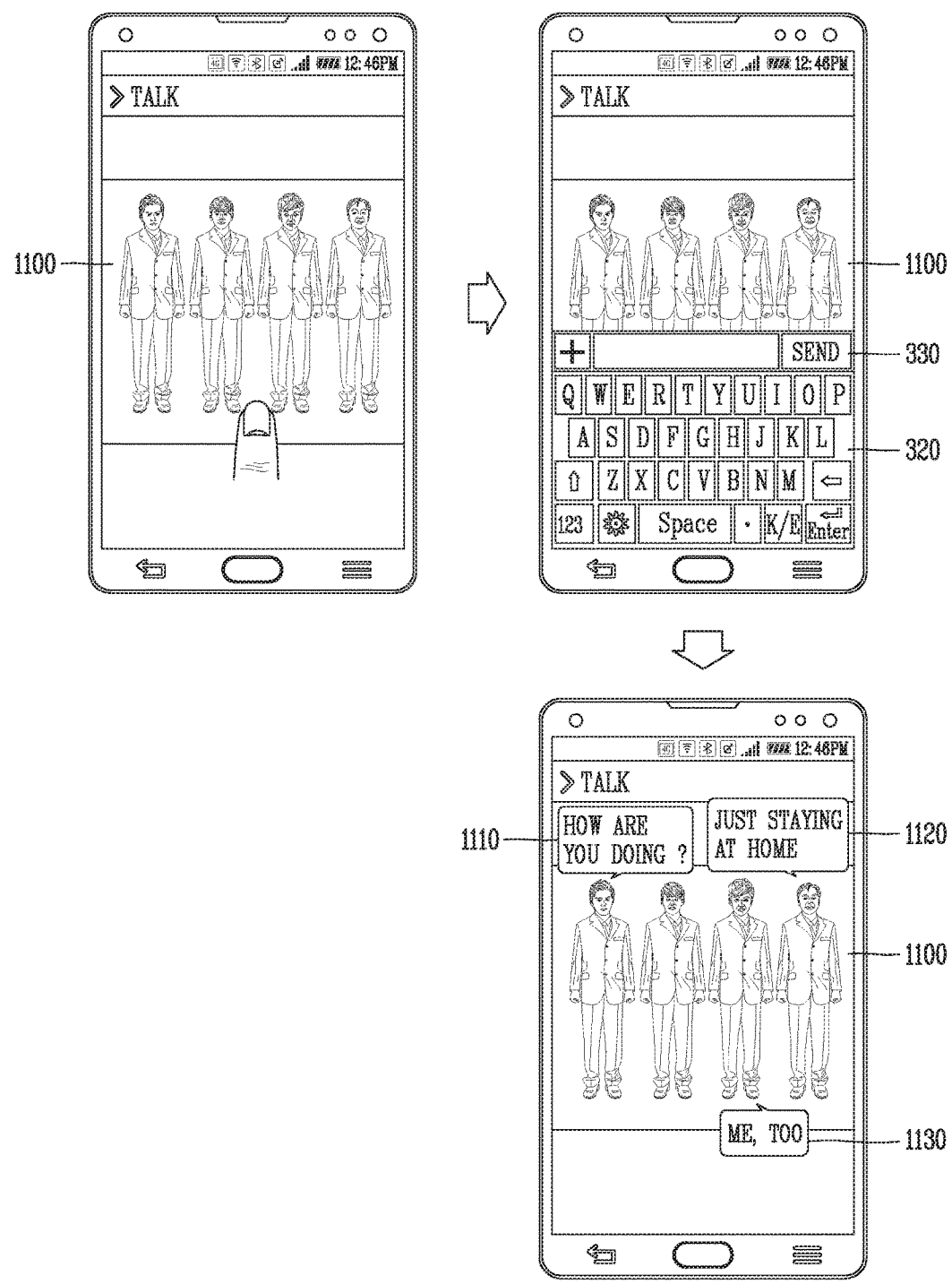
FIG. 11 is a conceptual view illustrating an embodiment in which a user exchanges messages with a plurality of people, while sharing an image with the plurality of people included in the image.

FIG. 11 is a conceptual view illustrating an embodiment in which a user exchanges messages with a plurality of people, while sharing an image with the plurality of people included in the image.

Referring to FIG. 11, when a touch input is applied to a photo image 1100 in which a plurality of persons (counterparts) are output, messages exchanged with the plurality of counterparts may be output on the photo image 1100.

Specifically, when a touch input is not applied to a specific person among the plurality of persons (when a touch input is applied to the background, or the like), group chatting with a plurality of counterparts may be performed.

To this end, a touch keyboard 320 for creating a message and an output window 330 for outputting a message being created may be output at a lower portion of the screen 151. Accordingly, when the user creates a message 1110, the message 1110 may be output to the output window 330.

In addition, the created message 1110 may be transmitted to terminals used by the plurality of counterparts. To this end, the numbers of the terminals used by the plurality of counterparts may be searched from an address book, or the like.

In an embodiment, in case where the user of the terminal 100 is included in the photo image 1100, the message 1110 transmitted to the terminals used by the plurality of counterparts may be output in a speech bubble of the user. Similarly, a message 1120 received from a terminal of a first counterpart may be output in a speech bubble of the first counterpart, and a message 1130 received from a terminal of a second counterpart may be output in a speech bubble of the second counterpart. That is, group chatting may be performed with a plurality of counterparts.

The above embodiments are described in relation to photo images, but the present invention is not limited thereto. That is, a transmitted message may also be output in a video image.

Specifically, when a plurality of persons appear in a video, a plurality of thumbnails may be generated by persons, and chatting may be performed using the thumbnails. When a thumbnail is touched, the video may be played for a predetermined time based on the corresponding thumbnail and a speech bubble may be output.

Meanwhile, when a user input for selecting at least one of a plurality of specific objects is applied, the controller 180 may output data transmitted to and received from at least one external terminal corresponding to each of the at least one selected object, on the image.

Figure 12:
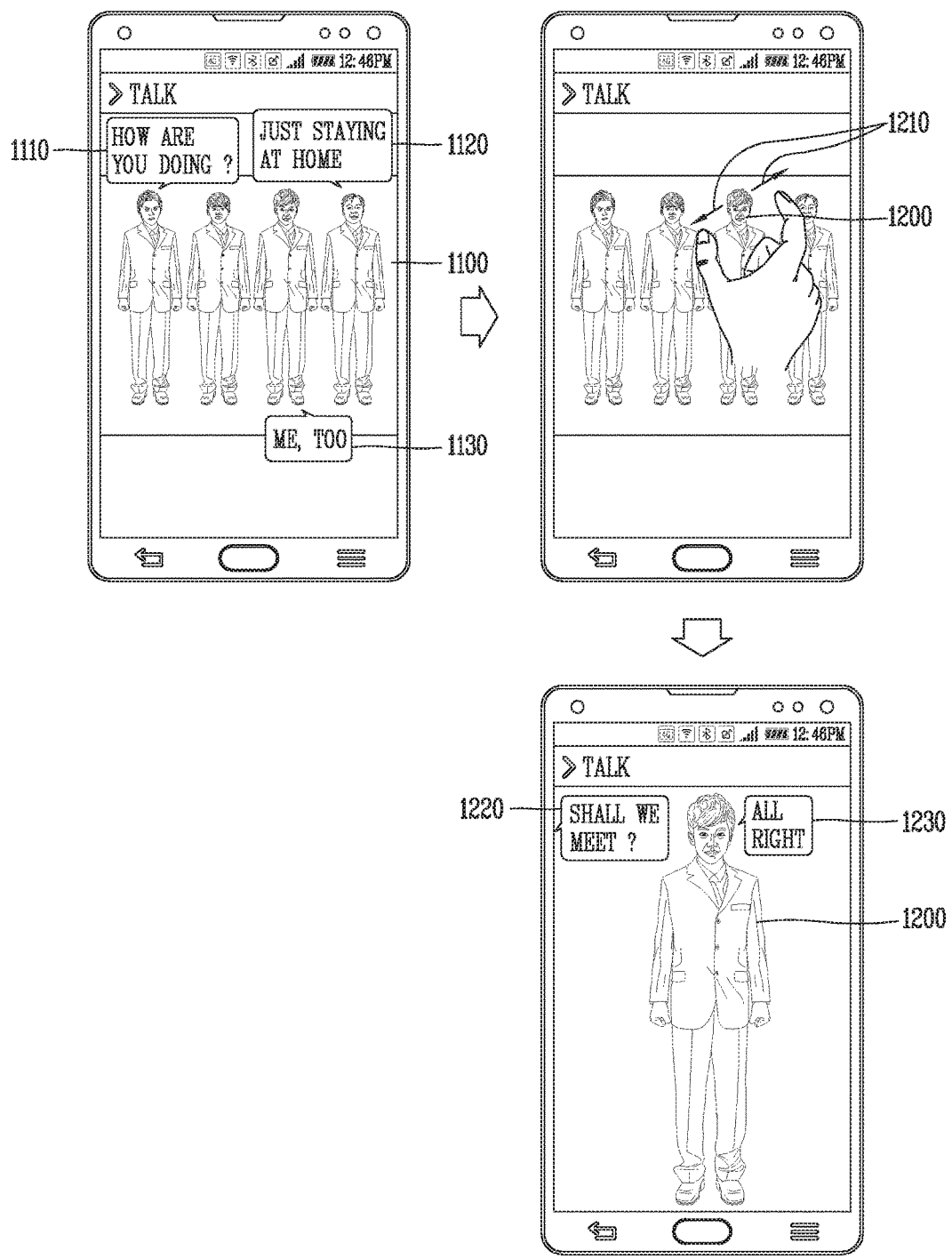
FIGS. 12 and 13 are conceptual views illustrating an embodiment in which a user exchanges messages with some of a plurality of people included in an image, while sharing the image.
Figure 13:
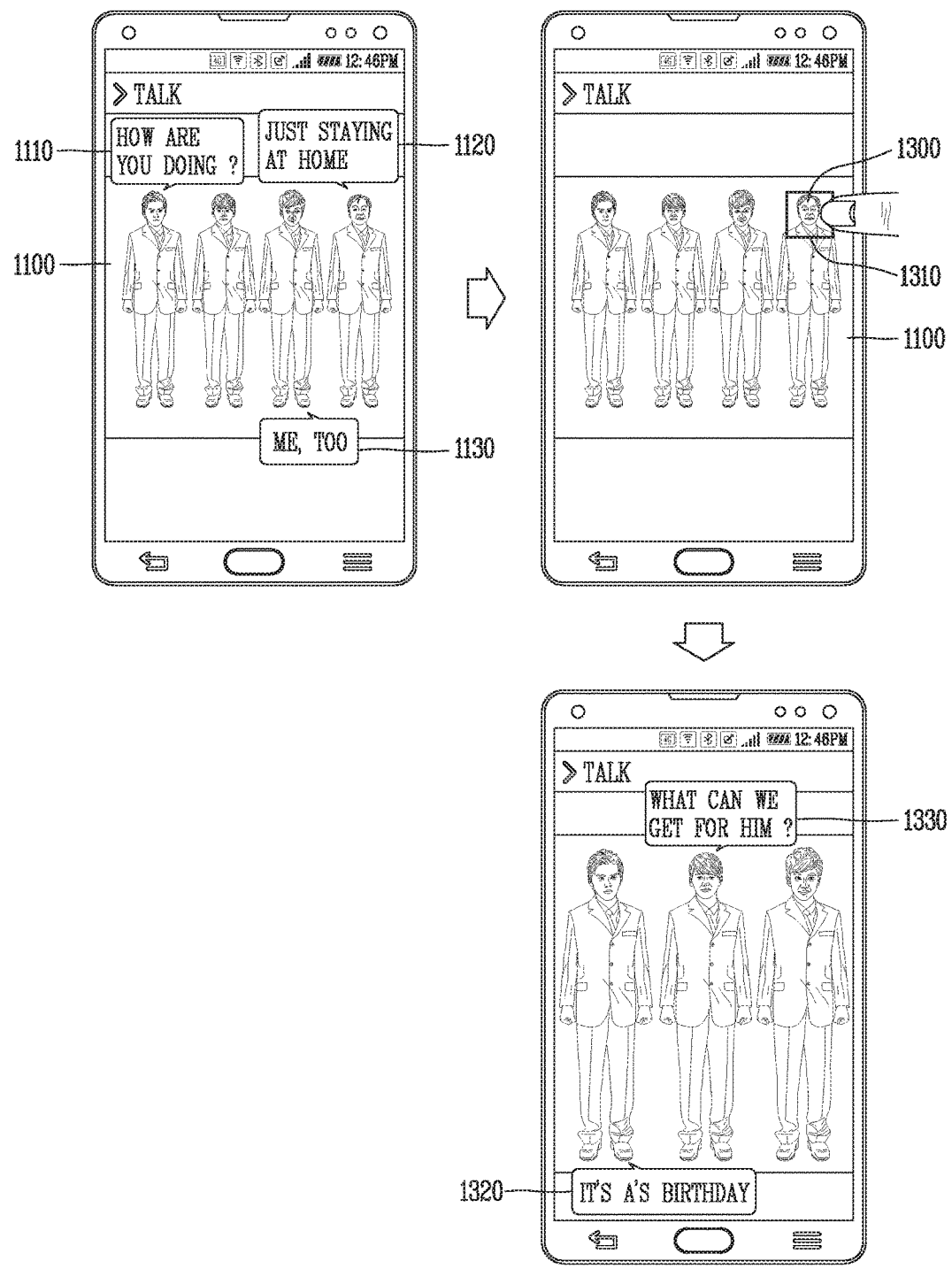

FIGS. 12 and 13 are conceptual views illustrating an embodiment in which a user exchanges messages with some of a plurality of people included in an image, while sharing the image.

Referring to FIG. 12, when the user of the terminal 100 is included in the photo image 1100, the message 1110 transmitted to the terminals used by the plurality of counterparts may be output in a speech bubble of the user as described above with reference to FIG. 11. Similarly, the message 1120 received from the terminal of the first counterpart may be output in the speech bubble of the first counterpart, and the message 1130 received from the terminal of the second counterpart may be output in the speech bubble of the second counterpart.

Thereafter, when a pinch-out input 1210 is applied to the second counterpart 1200 in the photo image 1100, the photo image 1100 is enlarged and only the second counterpart 1200 may be output on the screen 151.

Also, one-on-one chatting with the second counterpart 1200 may be performed. Accordingly, a message 1220 transmitted by the user of the terminal 100 may be transmitted only to the terminal of the second counterpart 1200, and a message 1230 received from the terminal of the second counterpart 1200 may be output in the speech bubble of the second counterpart 1200.

That is, a message may be transmitted only to a specified person, during group chatting with a plurality of counterparts.

In another embodiment, referring to FIG. 13, when the user of the terminal 100 is included in the photo image 1100, the message 1110 transmitted to the terminals used by the plurality of counterparts may be output in a speech bubble of the user as described above with reference to FIG. 11. Similarly, the message 1120 received from the terminal of the first counterpart may be output in the speech bubble of the first counterpart, and the message 1130 received from the terminal of the second counterpart may be output in the speech bubble of the second counterpart.

Subsequently, when a touch input for selecting a first counterpart 1300 in the photo image 1100, for example, a touch input 1310 drawing a closed curve containing the face of the first counterpart 1300, is applied, the photo image 1100 excluding the first counterpart 1300 may be enlarged and output.

In addition, group chatting, excluding the first party 1300, may continue. Accordingly, a message 1320 transmitted by the user of the terminal 100 may be transmitted only to the terminals of the counterparts other than the first party 1300, and a message 1330 received from the terminal of the counterpart may be output in the speech bubble of the counterpart who has transmitted the message.

That is, during the group chatting with the plurality of counterparts, the group chatting may continue except for the designated person.

Meanwhile, if photo images in which a plurality of counterparts are displayed are viewed consecutively, an icon asking whether to communicate with the plurality of counterparts may be output at a predetermined time point.

Figure 14:
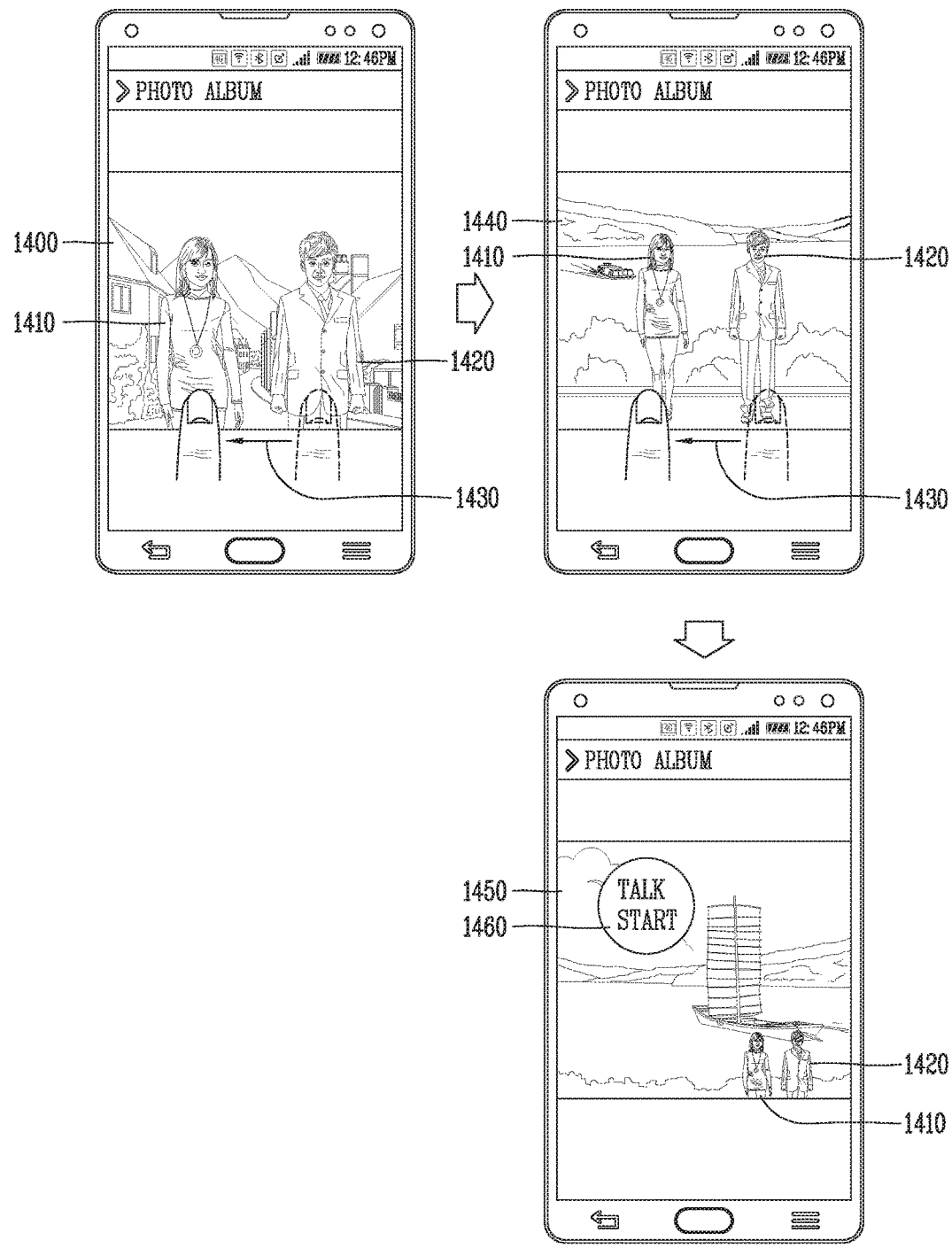
FIG. 14 is a conceptual view illustrating an embodiment in which an icon for starting group chatting is output when an image is viewed.

FIG. 14 is a conceptual view illustrating an embodiment in which an icon for starting group chatting is output when an image is viewed.

Referring to FIG. 14, when a flicking input 1430 is applied to a first image 1400 in which a first person 1410 and a second person 1420 are displayed, a second image 1440, which is a next image stored in a photo album, may be output.

Here, the first person 1410 and the second person 1420 may be displayed in the second image 1440. Thereafter, when the flicking input 1430 is again applied, a third image 1450, which is a next image stored in the photo album, may be output.

When the first person 1410 and the second person 1420 appear also in the third image 1450, an icon 1460 for starting group chatting with the first person 1410 and the second person 1420 may be output. Thereafter, when a touch input is applied to the icon 1460, a touch keyboard is output and group chatting may start with the first person 1410 and the second person 1420.

In the embodiment, a case where the photos including the same person are displayed three times in succession is described, but the present invention is not limited thereto. That is, various numbers may be set and the icon 1460 may be output when a preset time has elapsed.

Meanwhile, information related to a photo image may be searched, while viewing the photo image.

In an embodiment, when a touch input is applied to a bag in a photo image, a touch keyboard may be output. Thereafter, when the user inputs a word "purchase", information such as a store where the bag may be purchased, information for purchasing the same or similar bag, and the like, may be output.

In another embodiment, when a touch input is applied to a landscape photograph, a touch keyboard may be output. Thereafter, when the user inputs a word "travel", information related to a travel destination, information of the same or similar travel destination, and the like, may be output.

In another embodiment, when a touch input is applied to a food photograph, a touch keyboard may be output. Thereafter, when the user inputs a word "order", a seller of the food, a telephone number of the seller, price information, and the like, may be output.

Meanwhile, an embodiment related to a counterpart (conversation counterpart) of the terminal 100 will be described.

In order to share a picture image with a conversation counterpart, it is necessary to determine whether the corresponding picture image is stored in the terminal of the conversation counterpart. To this end, a file name of the photo image, a date, time, and a place in or at which the photo image was captured, and the like, may be used. Accordingly, whether to transmit the corresponding photo image may be determined according to whether the photo image is stored in the terminal of the conversation counterpart.

Further, the present invention may be executed by an IA function, a separate application, a function set in a photo album application, and the like.

If all of the above functions are executable in the terminal of the conversation counterpart, the same user interface (the speech bubble position may be changed) as that of the terminal 100 may be output. Here, if there is no photo image in the terminal of the conversation counterpart, the corresponding photo image may be transmitted and output as a background image.

Meanwhile, if it is difficult for the terminal of the communication counterpart to execute the functions, a notification message recommending installation of the application for executing the functions may be output. The notification message may be transmitted by SMS.

The functions may be provided by a manufacturer or may be downloaded from an application market, or the like. The application may exchange data with the same function as that of a chat application, and messages exchanged by SMS may be retrieved and output on the image.

In another embodiment, if it is difficult for the terminal of the communication counterpart to execute the functions, a message and a photo image transmitted by the user of the terminal 100 may be transmitted through SMS or MMS. Here, if a photograph is transmitted by MMS, contents of a text message may be output on the corresponding photograph.

In another embodiment, a user interface output from the terminal of the conversation counterpart may be output on a divided screen area of the terminal 100.

In another embodiment, a messenger application may be executed at the terminal of the conversation counterpart and conversation contents may be output. Here, a background image output to the terminal 100 may be transmitted and set as a background image (as a background image of a messenger application chat window) on the terminal of the conversation counterpart.

Effects of the mobile terminal and the control method according to the present invention are as follows.

According to at least one of the embodiments of the present invention, messages may be immediately exchanged with a conversation counterpart, while sharing an image with the counterpart, without having to execute a messenger application.

Further, according to at least one of the embodiments of the present invention, images shared with the conversation counterpart may be appropriately switched according to situations.

As a result, user convenience may be improved.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid-state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The invention claimed is:

1. A mobile terminal comprising:
   a display unit outputting an image including a specific object and outputting a data input window when a preset user input is applied to the specific object;
   a wireless communication unit, when data is input to the data input window, transmitting the input data to an external terminal corresponding to the specific object; and
   a controller outputting the input data on the image and outputting, when data is received from the external terminal, the received data on the image,
   wherein when the image corresponds to a photo image, the specific object corresponds to a first person, and the input data corresponds to text such that the preset user input is applied to the first person included in the photo image, the controller is configured to:
   cause the wireless communication unit to transmit a first message received in the data input window to a first terminal corresponding to the first person; and
   cause the display unit to display a second message received from the first terminal in the photo image such that the second message is displayed within a speech bubble corresponding to the first person.

2. The mobile terminal of claim 1, wherein
   when a preset event occurs, the controller switches the image to another image detected on the basis of data related to the image.

3. The mobile terminal of claim 2, wherein
   the controller switches image including a specific person to another image including the specific person at every preset period.

4. The mobile terminal of claim 2, wherein
   the controller switches the image to another image detected on the basis of a location and a time at which the image was captured, at every preset period.

5. The mobile terminal of claim 2, wherein
   on the basis of transmission and reception of specific data to and from the external terminal, the controller switches the image to another image detected on the basis of the specific data.

6. The mobile terminal of claim 2, wherein
   on the basis of a user input applied to select at least one of a plurality of images detected on the basis of data related to the image, the controller switches the image to the at least one selected image.

7. The mobile terminal of claim 1, wherein
   when a preset user input is applied to schedule information stored in a schedule application, the controller outputs data transmitted to and received from an external terminal corresponding to the schedule information, on an execution screen of the schedule application.

8. The mobile terminal of claim 2, wherein
   when a preset user input is applied to an image including a plurality of specific objects, the controller outputs data transmitted to and received from a plurality of external terminals respectively corresponding to the plurality of specific objects, on the image.

9. The mobile terminal of claim 8, wherein
when a user input is applied to select at least one of the plurality of specific objects, the controller outputs data transmitted to and received from at least one external terminal corresponding to each of the at least one selected object, on the image.

10. The mobile terminal of claim 1, wherein when the photo image includes a second person corresponding to the mobile terminal, the controller is further configured to cause the display unit to display the first message in the photo image such that the first message is displayed within a speech bubble corresponding to the second person and the second message is displayed within the speech bubble corresponding to the first person.

11. A method of controlling a mobile terminal, the method comprising:
(a) outputting an image including a specific object and outputting a data input window when a preset user input is applied to the specific object;
(b) when data is input to the data input window, transmitting the input data to an external terminal corresponding to the specific object; and
(c) outputting the input data on the image, and outputting, when data is received from the external terminal, the received data on the image,
wherein when the image corresponds to a photo image, the specific object corresponds to a first person, and the input data corresponds to text such that the preset user input is applied to the first person included in the photo image, the method further comprises:
transmitting a first message received in the data input window to a first terminal corresponding to the first person; and
displaying a second message received from the first terminal in the photo image such that the second message is displayed within a speech bubble corresponding to the first person.

12. The method of claim 11, wherein (c) includes:
switching the image to another image detected on the basis of data related to the image, when a preset event occurs.

13. The method of claim 12, wherein (c) includes: switching the image including a specific person to another image including the specific person at every preset period.

14. The method of claim 12, wherein (c) includes:
switching the image to another image detected on the basis of a location and a time at which the image was captured, at every preset period.

15. The method of claim 12, wherein (c) includes:
switching, on the basis of transmission and reception of specific data to and from the external terminal, the image to another image detected on the basis of the specific data.

16. The method of claim 12, wherein (c) includes:
switching, on the basis of a user input applied to select at least one of a plurality of images detected on the basis of data related to the image, the image to the at least one selected image.

17. The method of claim 11, wherein (c) includes:
outputting, when a preset user input is applied to schedule information stored in a schedule application, data transmitted to and received from an external terminal corresponding to the schedule information, on an execution screen of the schedule application.

18. The method of claim 12, wherein (c) includes:
outputting, when a preset user input is applied to an image including a plurality of specific objects, data transmitted to and received from a plurality of external terminals respectively corresponding to the plurality of specific objects, on the image.

19. The method of claim 18, wherein (c) includes:
outputting, when a user input is applied to select at least one of the plurality of specific objects, data transmitted to and received from at least one external terminal corresponding to each of the at least one selected object, on the image.

20. The method of claim 11, wherein when the photo image includes a second person corresponding to the mobile terminal, the method further comprises displaying the first message in the photo image such that the first message is displayed within a speech bubble corresponding to the second person and the second message is displayed within the speech bubble corresponding to the first person.

* * * * *